US008652674B2

(12) United States Patent
Swift et al.

(10) Patent No.: US 8,652,674 B2
(45) Date of Patent: Feb. 18, 2014

(54) THERMAL BATTERY CATHODE MATERIALS CONTAINING NICKEL DISULFIDE AND BATTERIES INCLUDING SAME

(75) Inventors: Geoffrey Swift, Joplin, MO (US); Charles Lamb, Carthage, MO (US); Jim Ferraro, Baxter Springs, KS (US)

(73) Assignee: Eaglepicher Technologies, LLC, Joplin, MO (US)

( * ) Notice: Subject to any disclaimer, the term of this patent is extended or adjusted under 35 U.S.C. 154(b) by 203 days.

(21) Appl. No.: 13/161,614

(22) Filed: Jun. 16, 2011

(65) Prior Publication Data
US 2011/0318624 A1 Dec. 29, 2011

Related U.S. Application Data

(60) Provisional application No. 61/358,203, filed on Jun. 24, 2010.

(51) Int. Cl.
*H01M 6/36* (2006.01)
*H01M 4/48* (2010.01)
*H01M 4/58* (2010.01)

(52) U.S. Cl.
USPC .......................... 429/112; 429/223

(58) Field of Classification Search
USPC ............... 429/112, 221, 223, 323; 252/182.1
See application file for complete search history.

(56) References Cited

U.S. PATENT DOCUMENTS

| 3,898,096 | A | 8/1975 | Heredy et al. |
| 3,992,222 | A | 11/1976 | Walsh et al. |
| 4,259,415 | A | 3/1981 | Tamura et al. |
| 4,608,324 | A | 8/1986 | Fujii et al. |
| 4,728,590 | A | 3/1988 | Redey |
| 4,954,403 | A | 9/1990 | Plichta et al. |
| 5,180,642 | A | 1/1993 | Weiss et al. |
| H1335 | H | 7/1994 | Plichta et al. |
| 5,534,367 | A | 7/1996 | Kaun |
| 5,667,916 | A | 9/1997 | Ebel et al. |
| 5,696,437 | A | 12/1997 | Panther et al. |
| 5,736,275 | A | 4/1998 | Kaun |
| 6,465,129 | B1 | 10/2002 | Xu et al. |
| 6,580,908 | B1 | 6/2003 | Kroll et al. |
| 6,584,355 | B2 | 6/2003 | Stessman |
| 6,936,379 | B2 | 8/2005 | Gan et al. |
| 7,476,467 | B2 | 1/2009 | Park et al. |
| 2003/0082452 | A1 | 5/2003 | Ueda et al. |
| 2003/0104269 | A1 | 6/2003 | Gan et al. |

(Continued)

FOREIGN PATENT DOCUMENTS

| EP | 1 207 568 A2 | 5/2002 |
| EP | 1 295 851 A2 | 3/2006 |

(Continued)

OTHER PUBLICATIONS

IPDL Machine Translation of the Detailed Description of JP 2004-207210A (Jul. 2004).*

(Continued)

*Primary Examiner* — Gregg Cantelmo
(74) *Attorney, Agent, or Firm* — Oliff PLC

(57) ABSTRACT

A cathode material includes a primary active cathode material and an amount of $NiS_2$. Primary batteries (e.g., thermal batteries) can be provided that contain such a cathode material.

29 Claims, 4 Drawing Sheets

(56) References Cited

U.S. PATENT DOCUMENTS

| | | |
|---|---|---|
| 2003/0228520 A1 | 12/2003 | Kaun |
| 2005/0003269 A1 | 1/2005 | Nanjundaswamy et al. |
| 2005/0048370 A1 | 3/2005 | Guidotti et al. |
| 2005/0102005 A1 | 5/2005 | Krig et al. |
| 2005/0227146 A1 | 10/2005 | Ghantous et al. |
| 2007/0099080 A1 | 5/2007 | Pickett et al. |
| 2007/0250126 A1 | 10/2007 | Maile et al. |
| 2007/0281213 A1 | 12/2007 | Pyszczek |
| 2007/0292748 A1 | 12/2007 | Dekel et al. |
| 2008/0090138 A1 | 4/2008 | Vu et al. |
| 2008/0182170 A1 | 7/2008 | Rong et al. |
| 2008/0299447 A1 | 12/2008 | Fujiwara |
| 2010/0310917 A1 | 12/2010 | Swift et al. |

FOREIGN PATENT DOCUMENTS

| | | | |
|---|---|---|---|
| JP | A-61-135056 | | 6/1986 |
| JP | 2061962 A | | 3/1990 |
| JP | 2267861 A | | 11/1990 |
| JP | 2004207210 A | * | 7/2004 |
| WO | 2005-060026 A2 | | 6/2005 |
| WO | 2009-014845 A2 | | 1/2009 |

OTHER PUBLICATIONS

Jul. 27, 2010 International Search Report issued in Application No. PCT/US2010/027612.
Jul. 27, 2010 Written Opinion issued in Application No. PCT/US2010/027612.
May 10, 2010 International Search Report issued in Application No. PCT/US2010/026408.
May 10, 2010 Written Opinion issued in Application No. PCT/US2010/026408.
May 25, 2010 International Search Report issued in Application No. PCT/US2010/029984.
May 25, 2010 Written Opinion issued in Application No. PCT/US2010/029984.
Jun. 1, 2010 International Search Report issued in Application No. PCT/US2010/029980.
Jun. 1, 2010 Written Opinion issued in Application No. PCT/US2010/029980.
Jan. 28, 2010 International Search Report issued in Application No. PCT/IS2009/063716.
Jan. 28, 2010 Written Opinion issued in Application No. PCT/IS2009/063716.
Sep. 20, 2011 International Preliminary Report on Patentability issued in Application No. PCT/US2010/027612.
Hiroi et al., "Effective conductivities of FeS positives in LiCl-LiBr-LiF electrolyte at different states of charge", Journal of Applied Electrochemistry 16 (1986), pp. 309-311.
Masset et al., "Retained molten salt electrolytes in thermal batteries", Journal of Power Sources 139 (Available online Sep. 8, 2004), pp. 356-365.
U.S. Appl. No. 12/754,405, filed Apr. 5, 2010 in the name of Swift et al.
U.S. Appl. No. 12/614,667, filed Nov. 9, 2009 in the name of Chang et al.
U.S. Appl. No. 12/718,743, filed Mar. 5, 2010 in the name of Miller et al.
U.S. Appl. No. 12/754,417, filed Apr. 5, 2010 in the name of Swift et al.
U.S. Appl. No. 12/725,872, filed Mar. 17, 2010 in the name of Zhang et al.
U.S. Appl. No. 61/112,562, filed Nov. 7, 2008 in the name of Chang et al.
Aug. 29, 2012 Office Action issued in U.S. Appl. No. 12/754,405.
Sep. 14, 2012 Office Action issued in U.S. Appl. No. 12/614,667.
Sep. 24, 2012 Office Action issued in U.S. Appl. No. 12/725,872.
Nov. 13, 2012 Office Action issued in U.S. Appl. No. 12/754,417.
Oct. 16, 2012 Office Action issued in European Patent Application No. 09 752 072.0.
Jan. 10, 2013 Office Action issued in U.S. Appl. No. 12/725,872.
Oct. 24, 2011 European Search Report issued in European Patent Application No. 11171301.2.
Apr. 11, 2013 Office Action issued in U.S. Appl. No. 12/614,667.
Apr. 17, 2013 Office Action issued in U.S. Appl. No. 12/725,872.
Mar. 14, 2013 Office Action issued in U.S. Appl. No. 12/718,743.

* cited by examiner

THERMAL BATTERY CATHODE MATERIALS CONTAINING NICKEL DISULFIDE AND BATTERIES INCLUDING SAME This non-provisional application claims the benefit of U.S. Provisional Application No. 61/358,203, filed Jun. 24, 2010, which is hereby incorporated by reference in its entirety.

BACKGROUND

The field of this disclosure generally relates to a cathode material for use in thermal batteries and, more particularly, to a cathode material that includes a primary active material and an amount of nickel disulfide ($NiS_2$). The disclosure also relates to batteries (e.g., thermal batteries) that contain such cathode materials.

Thermal batteries tend to have relatively long shelf lives, high energy densities, require relatively low maintenance, and can withstand relatively high temperatures. Thermal batteries also tend to provide a short burst of power over a relatively short period of time. The burst may range from less than a second to an hour or more, with power typically ranging from about a watt or less to kilowatts. Such properties make thermal batteries suitable for military (e.g., batteries for missile guidance systems) and space exploration applications. Thermal batteries may also be used in other applications, such as in electric vehicles.

A typical thermal battery includes an anode, a cathode, an electrolyte-separator containing a solid electrolyte that is non-conductive at ambient temperature, and a pyrotechnic material (e.g., heat pellet as in FIG. 1, which may contain, for example, Fe—$KClO_4$ powder) that provides a heat source to the battery. When battery operation is desired, an external stimulus is applied to the battery. For example, an electrical current may be applied to the battery to set off an electric match or an electro-active squib, or a mechanical force (e.g., mechanical shock) may be applied to set off a concussion primer. The external stimulus causes the pyrotechnic material to ignite and begin to heat. Heat produced from the pyrotechnic material causes the previously solid electrolyte to melt and become conductive, which allows the battery to provide power for a desired application.

Thermal batteries are often formed using pellet techniques, such that each of the electrolyte, cathode, and heat source are formed into a wafer. In this case, the respective cell component chemicals are processed into powders and the powders are pressed together to form the cell. Each component may be formed as a discrete part, or the anode and/or cathode may include (i.e., be flooded with) electrolyte material to improve the conductivity of the cell.

The anodes of thermal batteries are generally formed of an alkali or alkaline earth metal or alloy. A typical anode includes lithium metal or a lithium alloy, such as lithium aluminum, lithium silicon, or lithium boron.

Electrolytes for use with thermal batteries often include a eutectic mixture (i.e., a mixture which solidifies at a temperature lower than each of the individual components) of lithium chloride and potassium chloride and a binder, such as MgO, fumed silica or clay minerals such as kaolinite (including kaolin clays which are known to be rich in kaolinite), which assists in containing the electrolyte within the thermal battery assembly, such as by capillary action, surface tension, or both. The electrolyte-separator is often composed of binary or ternary salts melting at temperatures above ambient, between for example 200° C. and 600° C. With typical thermal battery electrolytes, without sufficient binder, the electrolyte material may disperse throughout the battery, causing undesired shunts or short circuits in the cell.

Cathode material for thermal batteries may vary in accordance with a variety of design parameters and generally includes a metal oxide or metal sulfide. By way of example, iron oxide, iron disulfide or cobalt disulfide are often used as a cathode material.

Typical thermal batteries make use of what is essentially a monolithic cathode material. While the cathode may contain components other than an active cathode material, such as, for example, the electrolyte to provide flooding and a lithiation additive (i.e., a lithium compound other than a lithium salt) to control voltage, conventionally there is only one active material such as, for example, a metal oxide (e.g., $Fe_3O_4$) or metal sulfide (e.g., $CoS_2$ or $FeS_2$).

A continuing need therefore exists for cathode materials that contain additives that result in improvements in conductivity, voltage and lifetime. A continuing need also exists for primary batteries, such as thermal batteries, that incorporate such cathode materials and that exhibit such improved performance.

SUMMARY

In one aspect of the present disclosure, a battery includes an anode material, a cathode material, and an electrolyte material. The cathode material includes a primary cathode active material and $NiS_2$. The primary cathode active material is selected from the group consisting of a primary metal disulfide, a metal oxide and mixtures thereof. The electrolyte material includes at least about 25 wt % lithium bromide, at least about 4 wt % lithium chloride, at least about 42 wt % lithium fluoride and at least about 1 wt % potassium bromide.

In another aspect, a primary battery includes an anode material, a cathode material and an electrolyte material. The cathode material of the battery includes a primary cathode active material and $NiS_2$. The primary cathode active material is selected from the group consisting of a primary metal disulfide, a metal oxide and mixtures thereof.

A further aspect of the present disclosure is directed to a cathode material for use in thermal batteries. The cathode material includes a primary cathode active material and $NiS_2$. The primary cathode active material is selected from the group consisting of a primary metal disulfide, a metal oxide and mixtures thereof. The molar ratio of $NiS_2$ to primary cathode active material is less than about 1:3.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

Figure 1:
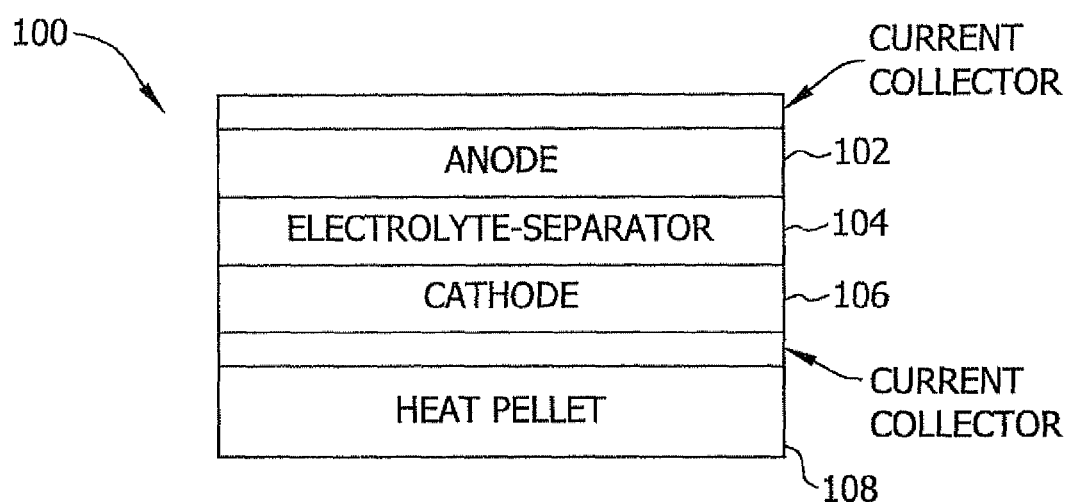
FIG. 1 illustrates an electrochemical device in accordance with various embodiments of the present disclosure.

Corresponding reference characters indicate corresponding parts throughout the drawings. It should be noted that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF EMBODIMENTS

The present disclosure generally relates to improved thermal battery cathode formulations and to batteries including the improved cathode material or formulation. FIG. 1 illustrates a thermal battery 100 that has an exemplary configuration suitable for use in thermal batteries of the present disclosure. The thermal battery includes an anode 102, an electrolyte-separator (electrolyte) 104, and a cathode 106. In accordance with the present disclosure, the cathode material may include a primary active material (e.g., $Fe_3O_4$, $FeS_2$, and/or $CoS_2$) and an amount of a sulfide of nickel (and more particularly nickel disulfide, $NiS_2$). As set forth in more detail below, the addition of $NiS_2$ to the primary active cathode material (e.g., $Fe_3O_4$, $FeS_2$ or $CoS_2$) results in improved cell performance.

As used herein, an "electrochemical device" may otherwise be referred to as a battery (and in some embodiments, a "thermal battery"), a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way. In one or more embodiments of the present disclosure, the electrochemical device is a primary battery which cannot be recharged after use. Primary batteries are typically less complex in their design and can be produced with less cost, relative to secondary batteries. Metal disulfide (e.g., $CoS_2$ or $FeS_2$) based secondary batteries may contain an additive such as $Li_2S$ which allow the battery to be capable of recharging.

In this regard, it should be understood that while the cathode materials of the present disclosure typically do not contain $Li_2S$, the compound may be produced during electrochemical discharge of the cell and cells which produce an amount of $Li_2S$ are considered to be within the scope of the present disclosure. Accordingly, as used herein, the phrase "substantially $Li_2S$-free" cathode material should be understood to include material which does not contain appreciable amounts of $Li_2S$ but which may contain such material upon discharge in an electrochemical cell. Further in this regard, material which is "substantially $Li_2S$-free" before discharge as used herein may contain less than about 1 wt % $Li_2S$, less than about 0.5 wt % $Li_2S$, less than about 0.1 wt % $Li_2S$, or may even contain no measurable or detectable amount of $Li_2S$, without departing from the scope of the present disclosure.

In accordance with various embodiments of the disclosure, cathode materials for use in thermal batteries are prepared by methods generally known in the art, including consolidating powders via a mechanical pressing operation or other powder handling means, such as tape casting, to produce pellets (i.e., wafers). The pellets are then stacked in a desired arrangement to provide voltage and current when the battery is activated.

Suitable primary active materials for the cathode include metal oxides, such as $Fe_3O_4$, or primary metal disulfides such as $FeS_2$, $CoS_2$ or mixtures thereof. In this regard, it should be understood that "primary metal disulfide" as used herein includes any metal disulfide but excludes $NiS_2$ which is included in the cathode as an additive as described below. Further, the term "primary" as used in "primary metal disulfide" is not meant to imply that the metal sulfide is present in a particular amount relative to any other cathode materials (e.g., relative to $NiS_2$, a second metal sulfide or a metal oxide) and it should be understood that combinations of metal oxides and metal sulfides may be used in the cathode in any relative proportion without limitation.

In accordance with the present disclosure, the primary cathode active material (e.g., metal oxide, such as $Fe_3O_4$, or primary metal disulfide, such as $FeS_2$, $CoS_2$ or a combination thereof) may be combined with an amount $NiS_2$ to enhance the conductivity, increase voltage, lengthen the lifetime and/or reduce the required heat input (as in thermal batteries) of batteries that include the cathode material. Particularly, in embodiments wherein the new cathode material is used in a primary thermal battery, it has been found that less heat is required to activate the battery in a manner that provides sufficient battery performance. Typically, less heat results in lower stack voltage and worse performance for thermal batteries. However, the new $NiS_2$-containing cathode succeeds in providing a longer run-down time compared to batteries that utilize conventional cathode material, as described in the Examples below. $NiS_2$ may be obtained commercially and may be produced synthetically from any of the methods available to those of skill in the art.

In this regard, it should be understood that the term "primary," as used herein in regard to "primary cathode active material" or simply "primary active material" should not be considered in a limiting sense. As described below, typically the amount of primary active material (both in terms of molar and weight amounts) in the cathode exceeds the amount of $NiS_2$; however, in some embodiments, the amount of $NiS_2$ in the cathode may exceed the amount of primary active material without departing from the scope of the present disclosure. The cathode material may also contain an amount of lithium such as $Li_2O$ to regulate the battery voltage (e.g., at least about 1 wt % or from about 1 wt % to about 5 wt % $Li_2O$). In this regard, it should also be understood that the lithiation additive (e.g., $Li_2O$) is not considered to constitute a part of the primary cathode active material.

The composition of the cathode material may vary in accordance with the desired cell application. Exemplary, non-limiting, compositions for cathode material are set forth below.

TABLE 1

Exemplary compositions for cathode material of embodiments of the present disclosure.

| Component | Exemplary Wt % | Exemplary Wt % | Exemplary Wt % |
|---|---|---|---|
| Primary Cathode Active Material (e.g., a metal oxide or primary metal disulfide such as $Fe_3O_4$, $FeS_2$ or $CoS_2$) | 28-72 | 47-65 | 53-62 |
| $NiS_2$ | 3-32 | 7-18 | 10-15 |
| Electrolyte Material (e.g., KCl—LiCl with MgO or KBr—LiBr—LiCl—LiF) | 20-40 | 25-35 | 28-32 |

TABLE 1-continued

Exemplary compositions for cathode material of embodiments of the present disclosure.

| Component | Exemplary Wt % | Exemplary Wt % | Exemplary Wt % |
|---|---|---|---|
| Lithiation Additive (e.g., $Li_2O$) | 0-5 | 0-3 | 0-2 |

In this regard, it should be noted that, more generally, the cathode material may contain, in various exemplary embodiments: at least about 28 wt % of the primary cathode active material (e.g., $Fe_3O_4$, $FeS_2$ or $CoS_2$), at least about 35 wt %, at least about 45 wt %, at least about 55 wt %, at least about 65 wt % or even at least about 70 wt % of the primary cathode active material; at least about 3% of $NiS_2$, at least about 5 wt %, at least about 10 wt %, at least about 15 wt %, at least about 20 wt %, at least about 25 wt % or even at least about 30 wt % $NiS_2$, and/or at least about 20 wt % of the electrolyte material, at least about 24 wt %, at least about 28 wt %, at least about 32 wt % or even at least about 36 wt % of the electrolyte material; and, optionally, at least about 1% lithiation additive or at least about 3 wt % lithiation additive. It is to be further noted that, in these or other exemplary embodiments, the cathode material may contain: no more than about 72 wt % of the primary cathode active material, no more than about 32 wt % of $NiS_2$, and/or no more than about 40 wt % of the electrolyte material and, when present, no more than about 5 wt % of the lithiation additive. In addition, it is to be noted that, in one or more of the embodiments detailed herein, the concentration of a recited component may be within a range bounded by any combination or permutation of the higher and lower concentration limits noted herein (e.g., between about 3 wt % and about 32 wt % or between about 10 wt % and about 32 wt % $NiS_2$), without departing from the intended scope of the present disclosure.

Furthermore in this regard, it should be noted that, since the cathode of the thermal batteries of the present disclosure typically contains flooded electrolyte, the components of the cathode material are typically expressed throughout the specification (e.g., as in Table 1 above and the proceeding paragraph) as a percentage of the total amount of active cathode materials, electrolyte materials and lithiation additives (if any). Additionally, or alternatively, it should be understood that, in some embodiments, the cathode does not contain electrolyte material (e.g., only the anode contains flooded electrolyte) and/or does not contain lithiation additives. For instance, if the cathode materials of Table 1 above did not contain electrolyte or lithiation additive, the cathode materials may have the exemplary, non-limiting compositions of Table 2 below.

TABLE 2

Exemplary compositions for cathode material of embodiments of the present disclosure that do not contain electrolyte material or lithiation additives.

| Component | Exemplary Wt % | Exemplary Wt % | Exemplary Wt % |
|---|---|---|---|
| Primary Cathode Active Material (e.g., a metal oxide or primary metal disulfide such as $Fe_3O_4$, $FeS_2$ or $CoS_2$) | 47-96 | 72-90 | 78-86 |
| $NiS_2$ | 4-53 | 10-28 | 14-22 |

In this regard, more generally in exemplary embodiments in which the electrode material does not contain electrolytes or lithiation additives, the cathode material may contain at least about 47 wt % of the primary cathode active material, at least about 50 wt %, at least about 60 wt %, at least about 70 wt %, at least about 80 wt %, at least about 90 wt % or even at least about 95 wt % of the primary cathode active material. In these and other embodiments, the cathode material may contain at least about 4 wt % $NiS_2$, at least about 10 wt %, at least about 20 wt %, at least about 30 wt %, at least about 40 wt % or even at least about 50 wt % $NiS_2$. It should be further noted that, in these and other exemplary embodiments, the cathode material may contain no more than about 96 wt % of the primary active cathode material and/or may contain no more than about 53 wt % $NiS_2$. As expressed above, the concentration of a recited component may be within a range bounded by any combination or permutation of the higher and lower concentration limits noted herein without limitation.

Accordingly, in these or other embodiments in which the cathode material does not contain electrolyte material or lithiation additives, the cathode material may consist of the recited components (e.g., the primary cathode active material and $NiS_2$) or, alternatively, consist essentially of these components (i.e., may include other compounds but exclude electrolyte materials, lithiation additives and all other active cathode materials). Further, in embodiments described above in which the cathode material includes one or more cathode primary active materials, $NiS_2$, electrolyte material and, optionally, lithiation additives, the cathode material may consist of these compounds or, alternatively, consist essentially of these compounds (e.g., exclude active cathode compounds other than the primary cathode active material and $NiS_2$).

In this regard, it should be understood that it has been found that regardless of whether the cathode contains additives such as an electrolyte material and/or lithiation additives, in embodiments wherein the amount of $NiS_2$ in the cathode material relative to the amount of the primary cathode active material is relatively low, the cathode is characterized by improved performance characteristics, despite incorporation of relatively low amounts of $NiS_2$. For example, and in various embodiments, the molar ratio of $NiS_2$ to primary cathode active material in the cathode may be less than 1:1 and preferably even less than about 1:3. In other embodiments, the ratio of $NiS_2$ to primary cathode active material may be less than about 1:5, or less than about 1:10. Accordingly, the ratio of $NiS_2$ to primary cathode active material may be in the range of, for example, from about 1:1 to about 1:20, or from about 1:3 to about 1:20, or from about 1:5 to about 1:10. In this regard, the molar ratio of nickel to primary cathode active material metal (e.g., the molar ratio of Ni to Fe and/or Co, or the combination thereof, when one or more of $Fe_3O_4$, $FeS_2$ or $CoS_2$ are used as primary active cathode materials) may also fall within the ranges described above relating to the molar ratio of $NiS_2$ to primary active cathode material.

An electrolyte that is suitable to flood the cathode and enable longer life from the cell may be prepared by mixing the salts, for example, potassium chloride (KCl) and lithium chloride (LiCl) eutectic, with a binder material such as MgO and fusing the salts above their liquidus temperature (e.g., at least about 500° C. or even at least about 650° C.). The fused salt-binder mixture is ground and sieved to restrict the particle size distribution. Generally, the size of the particles of the electrolyte material is not critical; however, the particle size is preferably consistent with typical battery manufacturing operations as dependent on the battery design as appreciated by those of skill in the art. For example, tape casting methods generally use smaller particles than pellet pressing methods.

When pellet pressing methods are used to form the electrolyte material (such as when the electrolyte material is used to flood a cathode or anode), the electrolyte particles are preferably screened such that they are sufficiently small to allow proper filling of the die but yet large enough such that they do not infiltrate the gap between the punch and the die. In tape casting methods, the particles are preferably sufficiently small to allow casting of a thin tape. Suitable particle size ranges may be readily determined by those of skill in the art.

The starting salt materials may be either in powder or granulated form and are preferably dried at a temperature sufficient to remove an amount of absorbed moisture (if Any). Moisture may be removed as much as economically practical and as much as practical in view of the selected manufacturing process. Generally, the amount of moisture is preferably reduced to an amount that does not cause an unacceptable amount of anode material oxidation. In some embodiments of the present disclosure, the electrolyte salt material may be heated, for example to a temperature of from about 100° C. to about 400° C., to remove moisture from the material.

If desired, a lithiation additive, such as lithium oxide ($Li_2O$), may be added to the electrolyte material to provide voltage regulation by limiting the peak voltage of the cell.

The battery components, as well as the battery itself, may in general be prepared by methods known in the art. Typically, the constituents (e.g., electrolyte salts, primary cathode active material and $NiS_2$) are weighed out in the appropriate ratio, such as ratios consistent with compositions described above, and mixed to obtain a homogeneous powder. The primary cathode active material and $NiS_2$ may be added directly to the electrolyte salt material or, alternatively, the primary cathode active material and $NiS_2$ may first be combined and mixed and then added and mixed with the electrolyte material. Physical mixing may proceed via any mechanical mixing method, for example, stirring the salts by hand, agitating the ingredients in a Turbula blender, rolling the container on a jar mill, or the like. Mixing may proceed from 15 minutes to 2 hours, depending on the total amount of salt and the manner of mixing.

As disclosed in U.S. Pat. No. 8,394,520 filed Apr. 5, 2010 as U.S. application Ser. No. 12/754,405, entitled "Thermal Battery Electrolyte Materials, Electrode-Electrolyte Composites, and Batteries Including Same," which is incorporated herein by reference for all relevant and consistent purposes, in addition to preparing cathodes using the additive in concert with traditional electrolytes to provide flooding, an additional formulation using a substantially binder-free electrolyte (that is, containing substantially no MgO or other binding agent) may be incorporated into the cathode material to provide additional cathode performance improvement in concert with the $NiS_2$ additive. This substantially binder-free electrolyte may be used as a replacement for the binder-containing electrolyte conventionally used in thermal batteries, such as a KCl—LiCl eutectic electrolyte material.

In this regard it is to be noted that, as used herein, a "binderless" electrolyte material (or, alternatively, an electrolyte material "substantially binder-free") generally refers to an electrolyte that contains essentially no conventional binder (e.g., MgO, fumed silica or clay minerals such as kaolinite). For example, in various embodiments, the electrolyte material may contain less than about 5 wt % binder, less than about 3 wt %, less than about 1 wt %, less than about 0.1 wt % or even no amount of binder (based on the total weight of the electrolyte material). Alternatively or in addition, the sum of the concentrations of the electrolyte material components (e.g., lithium bromide, lithium chloride, lithium fluoride, and optionally potassium bromide) may be at least about 95 wt %, at least about 96 wt %, at least about 97 wt %, at least about 98 wt %, at least about 99 wt % or even about 100 wt % (based on the total weight of the electrolyte material). Accordingly, in these or other embodiments, the electrolyte material may consist, or alternatively consist essentially of, the recited components (the electrolyte material being, for example, a ternary mixture of essentially three components, or a quaternary mixture of essentially four components).

Various exemplary substantially binder-free electrolyte materials, in accordance with various embodiments of the disclosure, include a salt mixture of lithium bromide (Liar), lithium chloride (LiCl), lithium fluoride (LiF), and optionally potassium bromide (KBr). The ratio of the three or four salts may vary, with preferred embodiments being in the ranges shown below.

TABLE 3

Exemplary compositions for electrolyte materials.

| Component | Exemplary Wt % | Exemplary Wt % | Exemplary Wt % | Exemplary Wt % |
|---|---|---|---|---|
| KBr | 0-12 | 1-9 | 1-3 | 9-12 |
| LiBr | 25-41 | 25-41 | 30-38 | 32-39 |
| LiCl | 4-14 | 4-14 | 9-12 | 5-7 |
| LiF | 42-64 | 42-64 | 50-60 | 42-53 |

In this regard it is to be noted that, more generally, the electrolyte material may contain, in various exemplary embodiments: at least about 25 wt % lithium bromide, at least about 30 wt %, at least about 35 wt %, or even at least about 40 wt % lithium bromide; at least about 4 wt % lithium chloride, at least about 6 wt %, at least about 8 wt %, at least about 10 wt %, or even at least about 12 wt % lithium chloride; at least about 42 wt % lithium fluoride, at least about 45 wt %, at least about 50 wt %, at least about 55 wt %, or even at least about 60 wt % lithium fluoride; and, optionally, at least about 1 wt % potassium bromide, at least about 2 wt %, at least about 4 wt %, at least about 8 wt %, or even at least about 10 wt % potassium bromide. It is to be further noted that, in these or other exemplary embodiments, the electrolyte material may contain: no more than about 41 wt % lithium bromide; no more than about 14 wt % lithium chloride; no more than about 64 wt % lithium fluoride; and, when present, no more than about 12 wt % potassium bromide. Finally, it is to be noted that, in one or more of the embodiments detailed herein, the concentration of a recited component may be within a range bounded by any combination or permutation of the higher and lower concentration limits noted herein (e.g., between about 25 wt % and about 41 wt %, or between about 30 wt % and about 41 wt % lithium bromide), without departing from the intended scope of the present disclosure.

In preparation of the cathode materials for use in the cathode, the metal sulfides and/or metal oxides and $NiS_2$ may be purified (if needed) using water and acid washing techniques and magnetic screening to remove impurities, and as desired may be passed through a sieve to limit the particle size to some specified range. As described above in regard to the electrolyte salts, the particle size of the cathode material is preferably selected to be consistent with the cell manufacturing methods of use (e.g., tape casting or pellet pressing) and moisture is preferably be removed until a level of moisture that does not cause an unacceptable amount of cell oxidation is achieved. If using powder pressing for preparation of the cathode material, the mixed powder is weighed and introduced into a die and consolidated using a uniaxial mechanical pressing process. While the data presented in the Examples below is for materials tested using pressed powder pellets, the application of this material is also possible via means such as tape casting or other consolidation methods to prepare components for thermal batteries.

Once the pressed components are consolidated into pellets, thermal batteries may be prepared by assembling in stacks the various components including the anode 102, electrolyte-separator 104, and cathode 106, plus a heat source pellet 108 if applicable to the particular battery design. Assembly of one each of anode 102, electrolyte-separator 104, and cathode 106 comprises a single cell. Multiple cells may be stacked in series to produce a thermal battery. In this regard it should be understood that thermal battery designs other than as shown in FIG. 1 may be used without departing from the scope of the present disclosure.

EXAMPLES

FIG. 1 shows a stack arrangement of a thermal battery, including heat pellet 108 that would be used to melt the electrolyte upon battery activation. This arrangement was used in Example 2 below and this arrangement, without heat pellet 108, was used for the single cell tests discussed in Example 1 below.

Example 1

Figure 2:
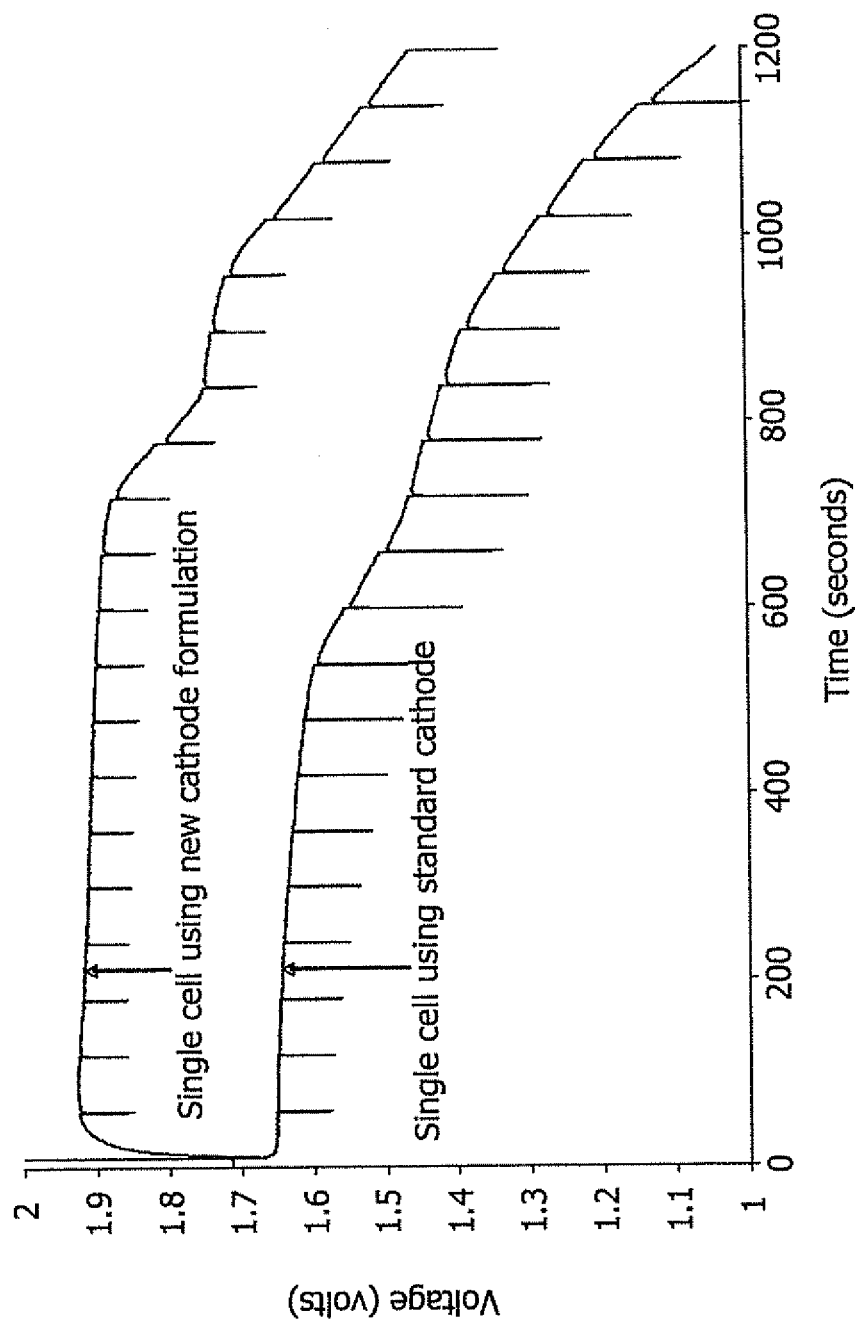
FIG. 2 illustrates a voltage trace diagram of a thermal battery cell of a first embodiment of the disclosure and a trace diagram of a conventional cell.

Voltage Traces and Impedance for Cells Having Non-Lithiated $FeS_2$ Cathodes with and without $NiS_2$ FIG. 2 illustrates voltage traces for two thermal single cells tested at 500° C., applying a 1 ampere base load with 5 ampere pulses applied every 60 seconds for a one second duration. The first single cell included a lithium-silicon alloy anode flooded with KCl—LiCl eutectic electrolyte, a LiBr—LiCl—LiF electrolyte-separator bound with MgO, and a cathode containing primarily $FeS_2$ (about 59.5% by weight) with synthetic $NiS_2$ (about 10.5% by weight) additive that is flooded with MgO-bound KCl—LiCl eutectic electrolyte making up the remaining 30% by weight of the cathode pellet. The first single cell was characterized by a $NiS_2$:$FeS_2$ (and Ni:Fe) molar ratio of 1:5.7. The second thermal single cell contained the same anode and electrolyte materials, but used a cathode containing only $FeS_2$ (70% by weight) flooded with the same MgO-bound electrolyte, hereafter referred to as the "standard cathode." The voltage of the standard cathode was modified (each data point was subtracted by 0.25 volts) to illustrate the performance of the two cells by avoiding overlap of the voltage traces. As can be seen from FIG. 2, the voltage roll-off of the new $FeS_2$—$NiS_2$ cathode material advantageously occurred later than with the standard cathode.

Figure 3:
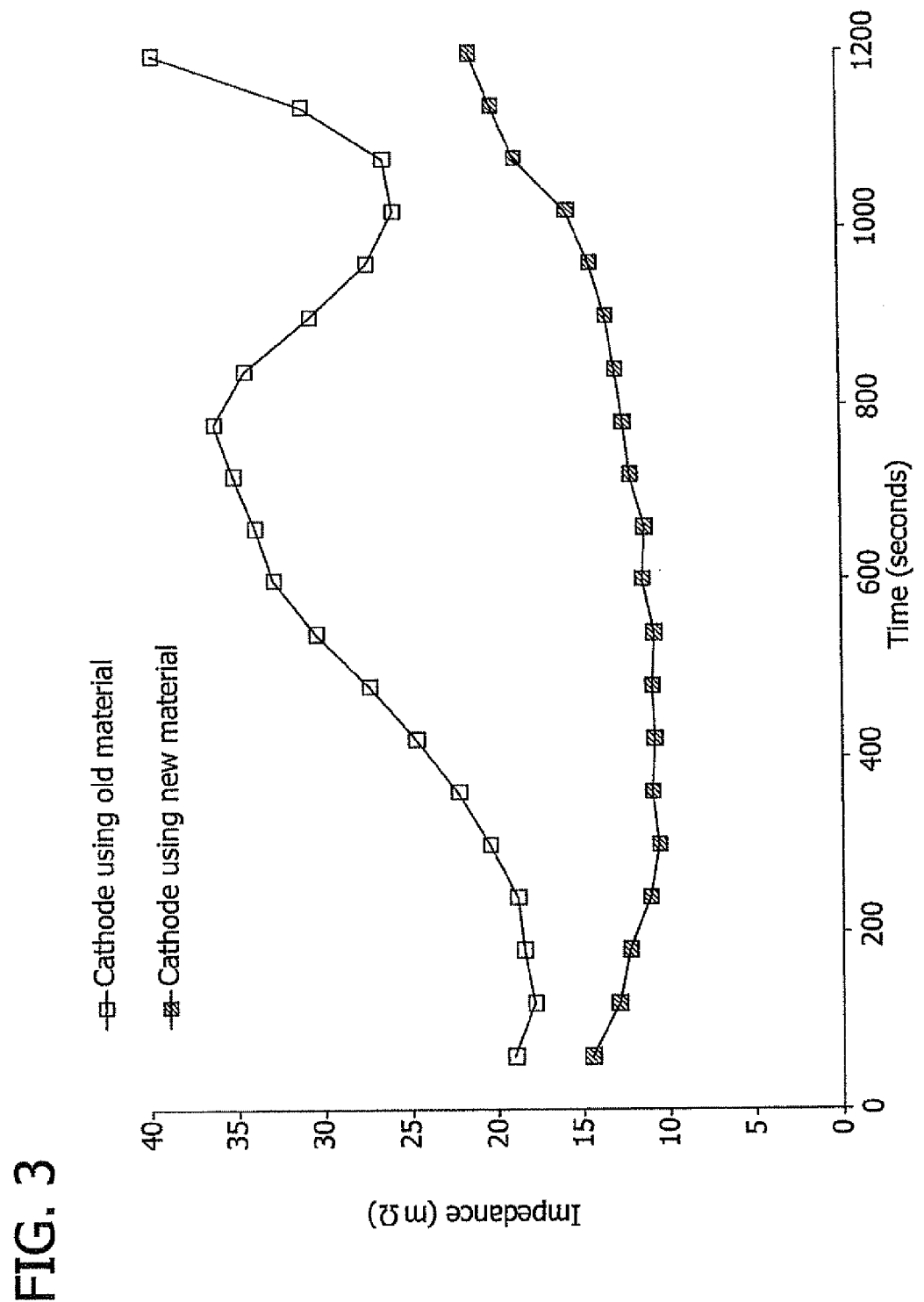
FIG. 3 illustrates an impedance trace of a thermal battery cell in accordance with the first embodiment of the disclosure and a conventional cell.

FIG. 3 shows the impedance of the single cells from the tests shown in FIG. 2. In FIG. 3, the open symbols are for the single cell using the standard cathode, while the solid symbols are for the single cell using the $FeS_2$—$NiS_2$ cathode formulation of the present disclosure. The impedance was computed using:

$$\text{impedance} = -\frac{\Delta V}{\Delta i} = -\frac{V_{Base} - V_{Pulse}}{i_{Base} - i_{Pulse}}$$

where $V_{Base}$ is the last voltage data under the base load of 1 ampere prior to application of a pulse, $V_{Pulse}$ is the first data point after application of the 5 ampere pulse, $i_{Base}$ and $i_{Pulse}$ are the corresponding data points for the current draw for which the $V_{Base}$ and $V_{Pulse}$ data points were collected. As illustrated in FIG. 3, the incorporation of the synthetic $NiS_2$ additive, keeping all other components (anode, electrolyte-separator) the same results in a significant improvement in performance relating to cell impedance reduction compared to the standard cathode.

Example 2

Figure 4:
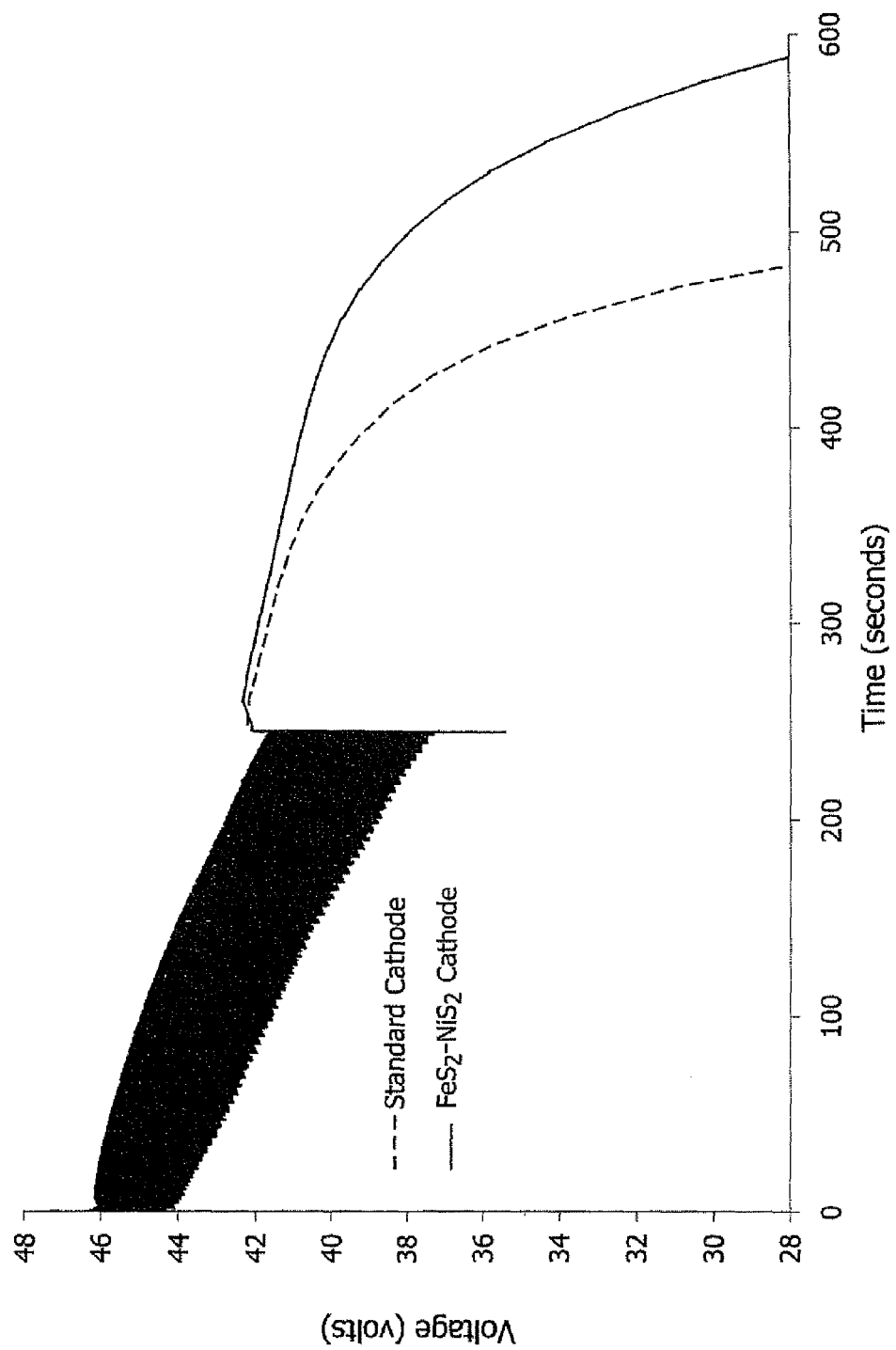
FIG. 4 illustrates a voltage trace diagram of a thermal battery cell of a second embodiment of the disclosure and a trace diagram of a conventional battery cell.

Voltage Traces for 24 Cell Batteries Having Lithiated $FeS_2$ Cathodes with and without $NiS_2$ FIG. 4 illustrates a voltage trace during a battery test using two different cathode materials. Each battery was tested by applying a 0.20 ampere base load with various pulses applied as follows: 7 ampere pulse for 10 milliseconds, then a 15 ampere pulse for 10 milliseconds, then 850 pulses of 6 amperes applied about every 250 milliseconds for 50 milliseconds, then another 15 ampere pulse for 10 milliseconds. The base load of 0.20 amperes resumed after the second 15 ampere pulse. Voltage was measured continuously during pulses and between pulses. Pulses were not applied after about 250 seconds.

The first cathode was substantially the same as the standard cathode of Example 1, but with addition of a lithiation additive ($Li_2O$) such that the composition of the "lithiated standard cathode" was about 70 wt % $FeS_2$, about 1.5 wt % $Li_2O$, and about 28.5 wt % MgO-bound KCl—LiCl eutectic electrolyte. The second cathode formulation contained about 57 wt % $FeS_2$, about 12 wt % $NiS_2$, about 1 wt % $Li_2O$ and about 30 wt % of a substantially binder-free electrolyte containing KBr, LiBr, LiCl, and LiF. The second cathode formulation was characterized by a $NiS_2$:$FeS_2$ (and Ni:Fe) molar ratio of 1:4.7.

Each battery was constructed using 24 cells stacked in series. Both batteries were stored at −45° F. (−43° C.). Each battery was activated using an electro-active squib. The squib ignited the heat pellets located between each cell and at the upper and lower ends of the battery. Less heat was required to provide suitable performance in the battery containing $FeS_2$—$NiS_2$ cathode relative to the conventional cathode. All anode, electrolyte-separator, and cathode pellets were prepared in the same weight for each battery to provide the best comparison. However, the heat pellets for the two batteries were pressed at different weights. The battery containing the new cathode used heat pellets of 6% lower weight (thus providing 6% less heat in calories to the battery stack). Surprisingly, the new $FeS_2$—$NiS_2$ cathode provided a longer run-down time (28V is the minimum voltage for this battery) after the pulsing ceased. During the pulsing, the band of voltage for the $FeS_2$—$NiS_2$ cathode was much narrower than the standard cathode, indicating lower impedance in the new cathode. While the upper voltage level (when no current pulse was being drawn) for the standard cathode was higher than the $FeS_2$—$NiS_2$ cathode during the pulses, the lower voltage level (when the pulse application was in progress) for the standard cathode was lower than the $FeS_2$—$NiS_2$ cathode. After the pulsing ceased (at about t=250 seconds), the voltage in the $FeS_2$—$NiS_2$ cathode was slightly higher than the standard cathode, taking longer to run down to 28 volts. The superiority of the $FeS_2$—$NiS_2$ cathode to the standard cathode is evident from the provision of comparable voltage under pulsing with reduced impedance, longer run-down time, and use of lower initial heat.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A battery comprising:
   an anode material;
   a cathode material; and
   an electrolyte material,
wherein:
   the cathode material comprises:
      a primary cathode active material selected from the group consisting of a primary metal disulfide, a metal oxide and mixtures thereof, and
      $NiS_2$; and
   the electrolyte material comprises:
      at least 25 wt % lithium bromide;
      at least 4 wt % lithium chloride;
      at least 42 wt % lithium fluoride; and
      at least 1 wt % potassium bromide.

2. The battery as set forth in claim 1, wherein the primary cathode active material is the primary metal disulfide, the primary metal disulfide being selected from the group consisting of $FeS_2$, $CoS_2$ and mixtures thereof.

3. The battery as set forth in claim 1, wherein the primary cathode active material is the primary metal disulfide, the primary metal disulfide being $FeS_2$.

4. The battery as set forth in claim 1, wherein the primary cathode active material is the metal oxide, the metal oxide being $Fe_3O_4$.

5. The battery as set forth in claim 1, wherein a molar ratio of NiS2 to the primary cathode active material is less than 1:1.

6. The battery as set forth in claim 1, wherein the cathode material comprises an amount of the electrolyte material.

7. The battery as set forth in claim 6, wherein the cathode material comprises:
   at least 28 wt % primary cathode active material; and
   at least 3 wt % $NiS_2$.

8. The battery as set forth in claim 6, wherein the cathode material comprises:
   no more than about 72 wt % primary cathode active material; and no more than about 32 wt % $NiS_2$.

9. The battery as set forth in claim 6, wherein the cathode material comprises from about 20% to about 40% electrolyte material.

10. The battery as set forth in claim 1, wherein the cathode material and electrolyte material are separate, and the cathode material comprises:
   from about 47 wt % to 96 wt % primary cathode active material; and
   from about 4 wt % to about 53 wt % $NiS_2$.

11. The battery as set forth in claim 1, wherein the electrolyte material is binder-free.

12. The battery as set forth in claim 1, wherein the electrolyte material is MgO-free.

13. The battery as set forth in claim 1, wherein the electrolyte material comprises:
   no more than about 41 wt % lithium bromide;
   no more than about 14 wt % lithium chloride;
   no more than about 64 wt % lithium fluoride; and
   no more than about 12 wt % potassium bromide.

14. The battery as set forth in claim 1, wherein the cathode material comprises at least 1 wt % $Li_2O$.

15. The battery as set forth in claim 1, wherein the cathode material consists essentially of primary cathode active material, $NiS_2$, optionally electrolyte material consisting essentially of lithium bromide, lithium chloride, lithium fluoride and potassium bromide and optionally $Li_2O$.

16. The battery as set forth in claim 15, wherein the battery is a thermal battery and comprises pyrotechnic material.

17. The battery as set forth in claim 1, wherein the anode material is selected from the group consisting of lithium, lithium alloys and mixtures thereof.

18. A primary battery comprising:
   an anode material;
   a cathode material; and
   an electrolyte material,
   the cathode material comprising:
      a primary cathode active material selected from the group consisting of a primary metal disulfide, a metal oxide and mixtures thereof; and
      $NiS_2$,
   wherein the electrolyte material comprises:
      at least 25 wt % lithium bromide;
      at least 4 wt % lithium chloride;
      at least 42% lithium fluoride; and
      at least 1 wt % potassium bromide.

19. The primary battery as set forth in claim 18, wherein the battery is a thermal battery and comprises pyrotechnic material.

20. The primary battery as set forth in claim 18, wherein the primary cathode active material is the primary metal disulfide, the primary metal disulfide being selected from the group consisting of $FeS_2$, $CoS_2$ and mixtures thereof.

21. The primary battery as set forth in claim 18, wherein the primary cathode active material is the primary metal disulfide, the primary metal disulfide being $FeS_2$.

22. The primary battery as set forth in claim 18, wherein the primary cathode active material is the metal oxide, the metal oxide being $Fe_3O_4$.

23. The primary battery as set forth in claim 18, wherein a molar ratio of $NiS_2$ to the primary active cathode material is less than 1:1.

24. The battery as set forth in claim 18, wherein the cathode material comprises:
   at least 28 wt % of primary cathode active material; and
   at least 3 wt % $NiS_2$.

25. A cathode material for use in thermal batteries, the cathode material comprising:
   a primary cathode active material selected from the group consisting of a primary metal disulfide, a metal oxide and mixtures thereof; and
   $NiS_2$;
   wherein:
   a molar ratio of $NiS_2$ to primary cathode active material is less than about 1:3; and
   the cathode material comprises an amount of electrolyte material, the electrolyte material comprising:
      at least 25 wt % lithium bromide;
      at least 4 wt % lithium chloride;
      at least 42 wt % lithium fluoride; and
      at least 1 wt % potassium bromide.

26. The cathode material of claim 25, wherein the molar ratio of $NiS_2$ to the primary cathode active material is less than 1:5.

27. The cathode material as set forth in claim 25, wherein the cathode material comprises:
   at least 28 wt % primary cathode active material; and
   at least 3 wt % $NiS_2$.

28. The cathode material as set forth in claim 25, wherein the cathode material comprises:
  no more than about 72 wt % primary cathode active material; and
  no more than about 32 wt % $NiS_2$.

29. The cathode material as set forth in claim 25, wherein the electrolyte material is binder-free.

\* \* \* \* \*